Patented Dec. 18, 1951

2,579,411

UNITED STATES PATENT OFFICE 2,579,411

PRODUCTION OF VINYL ETHERS

Robert L. Adelman, Niagara Falls, N. Y., assignor to E. I. du Pont de Nemours & Company, Wilmington, Del., a corporation of Delaware No Drawing. Application January 20, 1950, Serial No. 139,793

6 Claims. (Cl. 260—614)

This invention relates to a process for preparing vinyl ethers from vinyl esters.

Vinyl ethers may be prepared by reacting halogen-substituted olefins with hydroxy compounds (Ernst and Berndt, Ger. Patent 513,679 (1927)) or by dehydrohalogenating a halogen-substituted ether by means of a base (Horney and Skukys, U. S. P. 2,414,201 (1947); Botteron, U. S. P. 2,462,602 (1949)). Other methods include splitting alcohol from an acetal by pyrolysis in the presence of strong mineral acid (Schildkneckt, Zoss and McKinley, Ind. Eng. Chem. 39, 180–186 (1947); Bramwyche and Mugdan, U. S. P. 2,482,725 (1949)), by reaction of an acetal with $P_2O_5$ in quinoline (Claisen, Ber. 31, 1019 (1898)), by reacting sodium with a chloroacetal (Wislicenus, Ann. 192, 106 (1878)), or by reaction of alcohols with acetylene (U. S. P. 2,191,053 (1940); Plauson, U. S. P. 1,436,288 (1923); Plauson and Vielle, Brit. Patent 156,117 (1920); Brit. Patent 231,841 (1924)).

The most widely known method is the reaction of acetylene with alcohols or phenols at high temperatures in the liquid or vapor phase, using a strongly alkaline medium (Reppe, Brit. Patent 369,297 (1932)). Strongly alkaline conditions are not necessary, if a zinc or cadmium salt, preferredly as a complex with a tertiary heterocyclic base, is employed as catalyst at high temperatures (150–180° C.) and under acetylene at 10–20 atmospheres pressure (Reppe and Wolff, U. S. P. 2,017,355; U. S. P. 2,157,347; U. S. P. 2,157,348). At atmospheric pressure higher alcohols are successfully vinylated and alkaline catalyst is necessary (U. S. P. 2,021,869). With the use of an aromatic amine as solvent, with strong alkali (sodium alkoxide) as catalyst, alcohols generally react with acetylene at atmospheric pressure to form vinyl ethers. (Evans, U. S. P. 2,404,700).

Schildkneckt (Ind. Eng. Chem. 39, 180–186 (1947)) states that "the action of acetylene upon alcohols in the presence of mercuric salts or acidic catalysts gives primarily acetals, and good yields of vinyl alkyl ethers are not obtained." It is also apparent that no satisfactory low temperature method of preparing vinyl ethers, either under acid or basic conditions, exists.

This invention has as an object the provision of a new process for the preparation of vinyl ethers at low temperatures under slightly acidic conditions. Another object is a new process for the interaction of vinyl esters with alcohols. Another object is the provision of a new process for preparing vinyl ethers containing groups easily destroyed by strongly alkaline conditions or high temperatures. Another object is the properation of vinyl ethers of alcohols containing ester, keto, heterocyclic, aldehyde, acetal, ether, nitrile, amide, halogen, or other groups injured by high temperatures or caustic. Another object is the preparation of vinyl ethers and acetals of phenols. Other objects will appear hereinafter.

These objects are accomplished by the following invention which broadly comprises the reaction of a vinyl ester in the presence of mercury salts of strong acids at low temperatures, with compounds containing at least one hydroxyl group attached to carbon. An interchange occurs in which a carboxylic acid is liberated, and the vinyl ether of the hydroxyl-containing compound is formed. The equation for the reaction may be written as follows:

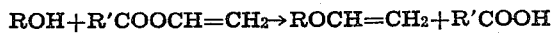

$ROH + R'COOCH = CH_2 \rightarrow ROCH = CH_2 + R'COOH$

Heretofore reactions of vinyl esters with aliphatic hydroxy compounds (alcohol) in the presence of mercury catalysts at temperatures of 0 to 75° C., have produced only acetals (Croxall et al. U. S. Patents 2,446,171; 2,447,975; J. A. C. S. 70, 2805 (1948)). The same reaction with aromatic hydroxy compounds (phenols) produced only polymeric materials (Croxall et al., ibid.). With sulfuric acid as catalyst, in the absence of mercury compounds, vinyl phenols (hydroxystyrenes) have been produced by reacting phenols with vinyl acetate (Niederl et al., J. A. C. S. 53, 3390 (1931)). I have now discovered that by maintaining the reaction temperature below 0° C., and preferably not higher than −15° C., in the presence of mercuric salts of strong acids, vinyl esters react with alcohols to produce vinyl ethers, as indicated by the equation given above. I have further discovered that at temperatures from −75° C. up to +30° C. in the presence of catalytic amounts of a mercuric salt of a strong acid, in a reaction medium substantially free from excess free, strong acid, phenols react to produce both the vinyl ethers of the phenols and acetals of the phenols.

The invention is illustrated by the following examples.

*Example 1.—Vinyl ethyl ether*

The following reagents were added to a flask at −22° C., in the order given, with agitation: 46 g. (1 mole) absolute ethanol, 516 g. (6 moles) vinyl acetate, 0.005 g. copper resinate, 1.8 g. mercuric acetate, 0.2 g. sulfuric acid. The catalyst dissolved in the solution and the acetic acid formed (as determined by titrating an aliquot with ice plus standard alkali) amounted to 0.6 equivalent after 1¾ hours. An exothermic reaction then set in which raised the internal temperature to —14° C. and was still rising, as 5 g. of sodium acetate were added which deactivated the catalyst and stopped the reaction. The reaction mixture was poured into a solution of 100 g. sodium carbonate in one liter of ice water, shaken well, the organic layer separated and shaken again with a solution of 10 g. sodium carbonate in 200 ml. ice water, dried by contact with a mixture of sodium carbonate, sodium sulfate and "Drierite," and distilled at atmospheric pressure through a three-foot packed column. Four g. (5%) of vinyl ethyl ether (B. P. 35–36° C.) was obtained, despite the exothermic reaction which carried the reaction temperature too high and caused secondary product (acetal and acetoxy acetal) formation.

*Example 2.—Vinyl ether of methyl glycolate*

The following reagents were added to a flask fitted with a stirrer and thermometer at —22° C.: 90 g. (1 mole) methyl glycolate, 516 g. (6 moles) vinyl acetate, 0.005 g. copper resinate, 1.8 g. (0.3%) mercuric acetate, 0.2 g. sulfuric acid were added in order, with stirring. After one hour, the homogeneous solution contained 0.46 moles acetic acid. After 2 hours, the solution contained 0.6 mole acetic acid. The reaction solution was poured rapidly into a solution of 106 g. of sodium carbonate in one liter of ice water. The mixture was well shaken, the organic layer separated, dried first with sodium sulfate, followed by a mixture of sodium carbonate and sodium sulfate, and distilled under reduced pressure. After removal of unchanged vinyl acetate, there was obtained 36 g. of vinyl ether of methyl glycolate ($CH_2=CH-O-CH_2COOCH_3$), B. P. 80–84°/82 mm., $n_D^{20}=1.4236$, $d^{30}=1.0502$, bromine equiv. 115 (theory 116). Eight g. holdup and residue remained, indicating negligible acetal and acetoxy acetal formation. Thus, a 30% conversion and over 90% yield of the vinyl ether was obtained. Samples of the product were instantly oxidized by 1% neutral $KMnO_4$ and rapidly polymerized by 0.01% BF·etherate in ether to a viscous oil.

*Example 3.—Vinyl ethers of 1,5-pentanediol*

104 g. (1 mole) of 1,5-pentanediol, 516 g. (6 moles) of vinyl acetate, 1.8 g. mercuric acetate, 0.005 g. copper resinate, and 0.2 g. sulfuric acid were added in the above order at —25° C. to a flask, with good stirring to disperse the two-phase system. After three hours, 0.5 mole acetic acid had formed and a homogeneous solution had resulted. The solution was then worked up as in Example 2 and 30 g. monovinyl ether of pentanediol (B. P. 92–95°/9 mm., $n_D^{21}=1.4461$) was obtained, with less than 12 g. nonviscous residue and holdup. Thus, 25% conversion and over 90% yield of monovinyl ether was obtained. The infra-red spectrum was exactly the same as an authentic sample of the monovinyl ether prepared by reacting acetylene with pentanediol in the presence of alkali. By the same procedure, the divinyl ether of pentanediol was prepared by allowing the reaction to proceed for 7 hours.

*Example 4.—Vinyl ether of tetrahydrofurfuryl alcohol*

102 g. (1 mole) of tetrahydrofurfuryl alcohol, 516 g. (6 moles) vinyl acetate, 0.001 g. copper resinate, 3 g. (0.5%) mercuric acetate, and one g. sulfuric acid were added in above order to a flask at —15° to —18° C. with stirring. After 1½ hours, 0.6 mole acetic acid had formed; and after 2½ hours, the total acetic acid present had dropped to 0.55 mole, indicating acetal and acetoxy acetal formation had already begun. Nevertheless, after addition of 5 g. of sodium acetate, extracting with one mole of sodium carbonate in ice water, and drying and distilling the organic layer, there was obtained 28 g. (22%) of the vinyl ether of tetrahydrofurfuryl alcohol, B. P. 80–81°/45 mm., $n_D^{20}=1.4480$, highly unsaturated to bromine in carbon tetrachloride, or neutral 1% permanganate, and readily polymerized by 0.01% boron trifluoride in ether at 60° C. to a very viscous oil. 105 g. of a mixture of acetoxy acetal and acetal were also formed in the reaction. At lower temperatures, e. g. —20 to —30° C., less of these by-products are formed.

*Example 5.—Vinyl phenyl ether and acetals of phenol*

94 g. (1 mole) phenol, 516 g. (6 moles) vinyl acetate, 0.01 g. copper resinate, 3.8 g. mercuric acetate, and 1.1 g. sulfuric acid were added in the above order to a flask with stirring at 25° C. Within thirty minutes, 0.6 mole acetic acid had formed in the solution. Five g. sodium acetate were stirred into the solution, and the mixture distilled under reduced pressure. After removal of the vinyl acetate, 5 g. (4%) vinyl phenyl ether was obtained, B. P. 36–38°/6 mm., $n_D^{22}=1.5188$, % C found 79.3, 79.0, theory 80.0; % H found 6.5, 6.8, theory 6.6. Insoluble in 10% alkali, polymerizes with 0.01% boron trifluoride in ether to a glass-like solid. 79 g. of acetoxy acetal of phenol (a new compound) $C_6H_5-OCH(OCOCH_3)CH_3$ were also obtained, B. P. 82–85/4.5 mm., $n_D^{22}=1.4924$.

By the same procedure at a lower temperature (—35° C.) for 1½ hours, 20 g. (33%) vinyl phenyl ether and 40 g. (38%) diphenyl acetal, B. P. 122–124°/4.5 mm., $n_D^{22}=1.5602$, were obtained.

*Example 6.—Monovinyl ether of ethylene glycol*

120 g. (2 moles) of ethylene glycol, 576 g. (6 moles) of vinyl acetate, 4 g. (0.6%) mercuric acetate, and 0.4 g. of sulfuric acid were added in above order to a flask with vigorous stirring at —20° C. After 4 hours at this temperature, 2 layers still existed showing reaction had not progressed very rapidly. However, the catalyst was deactivated by adding 5 g. sodium carbonate, and upon distillation was obtained 3 g. monovinyl ether of ethylene glycol (B. P. 55°/20 mm., $n_D^{21}=1.4560$) and a 91% (111 g.) recovery of ethylene glycol.

In all cases, little or no polymeric materials were obtained and the yields of vinyl ether increased at lower temperature. It should be clear that other experimental techniques of working up the reaction products are possible and within the scope of this invention.

Any vinyl ester of a carboxylic acid may be employed in practicing my invention. Examples include vinyl formate, vinyl acetate, vinyl caprylate, vinyl laurate, vinyl benzoate, vinyl halobenzoates, divinyl adipate and vinyl furoate. Likewise, the substitution products of vinyl esters having the type formula $RCOOCHR'=CH_2$ such as isopropenyl acetate may be employed herein in place of the vinyl esters.

The hydroxy compound reactant is of the type R—OH, where R is an aliphatic, aromatic, or heterocyclic group, which may also contain other functional groups, such as unsaturated carbon-carbon bonds, hydroxyl, ketone, acetal, ether, ester, carboxyl, halogen, amide, or nitrile groups. Examples include methanol, ethanol, isopropyl alcohol, tertiary butyl alcohol, lauryl alcohol, allyl alcohol, crotonyl alcohol, tetrahydrofurfuryl alcohol, ethylene glycol, 1,5-pentanediol, glycerol, ethylene glycol monomethyl ether, diethylene glycol monomethyl ether, diacetone alcohol, glycolic aldehyde, ethylene glycol monoacetate, glycerol diacetate, glycolic acid, methyl glycolate, hydroxy trimethyl acetic acid, hydroxy acetamide, hydroxy acetonitrile, acetone cyanohydrin, amino methylols, ethylene cyanohydrin, pentamethylene cyanohydrin, ethylene chlorohydrin, and pentamethylene chlorohydrin, polymethylene glycols, polyethylene glycols, phenol, cresol, toluol, picric acid, resorcinol, resorcinol monomethyl ether, salicylic acid, naphthols, aminonaphthols and the like.

The catalyst used is a mercuric salt of a strong acid, such as mercuric sulfate, mercuric phosphate, or mercuric oxide · boron trifluoride complex. By "strong acid" I mean one whose acid strength is not weaker than that of phosphoric caid. If mercuric sulfate is used, it is preferred to prepare the mercuric sulfate in situ (as for example, from mercuric acetate or oxide and sulfuric acid), as the catalyst so prepared dissolves more readily in the reaction medium and is considerably more reactive than the preformed catalyst. An excess of free, strong acid is not desirable, however, as this causes an increase in by-product formation by the addition of hydroxyl and carboxyl groups to the vinyl ether, and also polymerization. There should be substantially no free strong acid present when reacting a phenol with a vinyl ester at temperatures of 0° C. and higher. Inhibitors such as hydroquinone, copper acetate, or copper resinate may be added to prevent polymerization of the vinyl esters and the unsaturated reaction products.

The catalyst concentration may be varied from 0.05% to 10% by weight of alcohol used depending upon the reactivity of the reactants. Thus, n-butanol with vinyl acetate generally requires only 0.1% mercuric sulfate while to react t-butyl alcohol around 5% mercuric sulfate will be used, at —40° C., to get a satisfactory conversion to vinyl ether in less than four hours. In general 0.2%–5% catalyst concentrations have been found to be a satisfactory working range.

The ratio of reactants may be varied over wide limits but, in general, a considerable excess of vinyl ester over hydroxy compound (e. g., 2 to 8 moles of ester per mole of hydroxy compound) is preferred, to encourage the reaction in the direction of vinyl ether formation, and to provide a quantity of the vinyl ester to act as reaction solvent. Mutual solvents for the vinyl ester and alcohol may be used when desired, e. g., to place the hydroxy compound in solution. For example, acetic acid may be used as solvent for reacting the vinyl ester with hydroxy acids which may not be soluble in vinyl esters at low temperatures. The acetic acid solvent is also useful in reacting vinyl esters with hydroxy compounds such as amino alcohols which, in the absence of the acidic solvent, tend to deactivate the mercury catalyst.

Temperature control is essential to obtain vinyl ethers in accordance with my invention; and to obtain the vinyl ethers from alcohols in practical yield the temperature should not exceed about —15° C. during the course of the reaction. If the temperature rises to 0° C. or higher, acetal, acetoxy acetol or polymeric products are formed.

At temperatures below 0° C., both vinyl ethers and the by-products may be formed; and in some cases, (e. g., phenol) acetal formation accompanies vinyl ether formation even at temperatures of —15° C. and lower. The tendency for acetal formation varies with different hydroxy compounds but in any case acetal formation is inhibited, and vinyl ether formation favored by lowering the reaction temperature below —15° C.

In all cases, for practical yields of the vinyl ethers with little or no acetal formation, the reaction temperature should not exceed —15° C. Temperatures higher than —15° C. but lower than 0° C., e. g., —10 to —5° C., may be employed in some cases when it is desired to obtain as reaction product a mixture of the vinyl ether and the acetal.

The practical minimum reaction temperature is about —75° C., as at temperatures below —75° C. the reaction generally is too slow for practical purposes; and for most hydroxy compounds, I prefer to employ a reaction temperature within the range: —60 to —15° C.

Still higher temperatures may be used, however, when the vinyl ester is reacted with a phenol, i. e., a hydroxy compound in which the hydroxy group is attached to a carbon atom in an aromatic group, as in phenol ($C_6H_5OH$) and the naphthols ($C_{10}H_7OH$). Such aromatic hydroxy compounds may be reacted with vinyl esters to produce mixtures of vinyl ethers, acetals and acetoxy acetals with little or no polymer formation at temperatures of from 0° C. to +30° C., using the above described mercuric salt catalyst, providing the reaction mixture is substantially free from uncombined strong acid. For example, when the catalyst is prepared in the reaction mixture by adding mercuric oxide and sulfuric acid, the amount of acid should not exceed that required to convert the oxide to mercuric sulfate. Or, using mercuric acetate and sulfuric acid a molar excess of mercuric acetate over sulfuric acid should be used. At temperatures below 0° C. and particularly below —15° C. the phenols react in the presence of the mercuric salt catalyst also to produce the vinyl ethers, acetals and acetoxy acetals; but at temperatures below 0° C., and particularly below —15° C., the molar ratio of vinyl ethers to by-products in the product is much greater than at the higher temperatures. Hence, to produce vinyl ethers of phenols, I prefer to utilize reaction temperature of —60 to —15° C.

The reaction preferably is carried out under anhydrous conditions, but small amounts of water, e. g., up to about 0.1% by weight of alcohol can be tolerated in the reaction mixture, but with an increase in by-product formation.

While the speed of reaction increases with increase of temperature, it varies greatly with the different hydroxy compounds. For example, primary aliphatic monohydric alcohols such as ethanol or butanol will react with vinyl acetate at —60° C. to obtain 80% or better conversion of the alcohol to vinyl ether within a space of four hours whereas with ethylene glycol at —20° C., after eight hours only about 10% was converted to the monovinyl ether (Example 6). This may be at least partially due to the insolubility of the glycol in the reaction medium. In the case of pentanediol, 25% conversion to the monovinyl ether was obtained in three hours at —25° C. (Example 3).

In general the secondary alcohols react slower than the primary alcohols and tertiary alcohols still slower. Alcohols containing nitrile or ester groups react more slowly than the corresponding unsubstituted alcohols, but chloro alcohols appear to react more rapidly. The relative rates of reaction for a number of alcohols are shown in the following table of experimental results. Each alcohol was reacted with vinyl acetate in the presence of 0.2% by weight of mercuric sulfate (based on weight of alcohol), utilizing a vinyl acetate to alcohol ratio of 6 to 1. In each case the reaction temperature was maintained at −30° C. At the end of the time period indicated, an aliquot of the reaction mixture was titrated with standard alkali, using phenolphthalein as indicator, to determine the amount of acetic acid formed, from which the per cent conversion of alcohol to vinyl ether was calculated, assuming negligible by-product formation.

| Alcohol | Time (Hours) | Per Cent Conversion |
|---|---|---|
| n-Butanol | 2 | 80 |
| 2-propanol | 3 | 66 |
| 2-methyl-2-propanol | 3 | 12 |
| 2-chloroethanol | 0.6 | 90 |
| 4-chlorobutanol | 0.7 | 20 |
| 2-cyanoethanol | 60.0 | 40 |
| 4-cyanobutanol | 3 | 34 |

Certain vinyl ethers which are more or less unstable under alkaline conditions or at elevated temperatures cannot be economically prepared by the conventional method of reacting in alcohol with acetylene. In one mode of practicing my invention, I prepare such vinyl ethers in a two-stage process, wherein acetylene first is reacted by conventional methods with a carboxylic acid to produce the vinyl ester (preferably with acetic acid to produce vinyl acetate) and I then react the vinyl ester with a hydroxy compound as above described to produce the vinyl ether. The carboxylic acid liberated in the interchange is then recycled to the acetylene reactor and reconverted to vinyl ester. This two-stage continuous process may be particularly useful for the large scale production of many of the vinyl ethers containing other reactive groups, such as the following:

Vinyl ether of 3 chloro 1-propanol $CH_2=CH-O-CH_2CH_2CH_2Cl$

Vinyl ether of hydroxy acetic acid $CH_2=CH-OCH_2COOH$

Vinyl ether of hydroxy acetic acid methyl ester

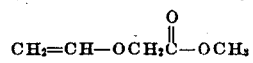

Vinyl ether of acetoin

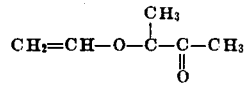

Vinyl ether of hydroxyvaleraldehyde $CH_2=CH-O(CH_2)_4CHO$

Vinyl ether of beta-hydroxy acrylonitrile $CH_2=CH-OCH_2CH_2CN$

Vinyl ethers of high boiling unsaturated alcohols.

The herein described invention provides a new process for the manufacture of vinyl ethers which employs reaction conditions (low temperature and non-alkaline) under which most vinyl ethers are stable; and it may be employed to produce vinyl ethers which could not be economically prepared by hitherto known methods. The invention thus may be used to prepare at relatively low cost a variety of vinyl ethers which may be used as intermediates for vinyl resins and other useful end products.

My invention also includes the new compound, the acetoxy acetal of phenol which has the formula:

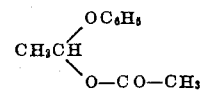

This new compound is useful in the solvents and perfume industry, and as a chemical intermediate.

I claim:

1. The process for the production of a vinyl ether which comprises reacting an alcohol with a vinyl ester at a temperature of −75 to −15° C. in the presence of a mercuric salt of a strong acid.

2. The process for the production of a glycol vinyl ether which comprises reacting a glycol with a vinyl ester at a temperature of −75 to −15° C. in the presence of a mercuric salt of a strong acid.

3. The process for the production of the vinyl ether of a phenol which comprises reacting a phenol with a vinyl ester at a temperature of −75 to −15° C. in the presence of a mercuric salt of a strong acid.

4. The process for the production of phenyl vinyl ether which comprises reacting phenol ($C_6H_5OH$) with vinyl acetate at a temperature of −60 to −15° C. in the presence of a mercuric salt of a strong acid.

5. The process for the production of a vinyl ether which comprises reacting methyl glycolate with vinyl acetate at a temperature of −60 to −15° C. in the presence of a mercuric salt of a strong acid.

6. The process for the production of a vinyl ether which comprises reacting 1,5-pentanediol with vinyl acetate at a temperature of −60 to −15° C. in the presence of a mercuric salt of a strong acid.

ROBERT L. ADELMAN.

REFERENCES CITED

The following references are of record in the file of this patent:

UNITED STATES PATENTS

| Number | Name | Date |
|---|---|---|
| 1,666,482 | Baum | Apr. 17, 1928 |
| 1,710,197 | Skirrow et al. | Apr. 23, 1929 |
| 1,791,301 | Davidson | Feb. 3, 1931 |
| 2,448,660 | Croxall et al. | Sept. 7, 1948 |